US006352952B1

(12) United States Patent
Jardine et al.

(10) Patent No.: US 6,352,952 B1
(45) Date of Patent: Mar. 5, 2002

(54) ADMIXTURE AND METHOD FOR OPTIMIZING ADDITION OF EO/PO SUPERPLASTICIZER TO CONCRETE CONTAINING SMECTITE CLAY-CONTAINING AGGREGATES

(75) Inventors: Leslie A. Jardine, Salem; Hideo Koyata, Waltham, both of MA (US); Kevin J. Folliard, Austin, TX (US); Chia-Chih Ou, Lexington, MA (US); Felek Jachimowicz, Brookline, MA (US); Byong-Wa Chun, Carlisle, MA (US); Ara A Jeknavorian, Chelmsford, MA (US); Christon L. Hill, Washington, DC (US)

(73) Assignee: W. R. Grace & Co. - Conn., New York, NY (US)

( * ) Notice: Subject to any disclaimer, the term of this patent is extended or adjusted under 35 U.S.C. 154(b) by 0 days.

(21) Appl. No.: 09/446,590

(22) PCT Filed: Jun. 19, 1998

(86) PCT No.: PCT/US98/12876

§ 371 Date: Dec. 21, 1999

§ 102(e) Date: Dec. 21, 1999

(87) PCT Pub. No.: WO98/58887

PCT Pub. Date: Dec. 30, 1998

Related U.S. Application Data

(60) Provisional application No. 60/050,697, filed on Jun. 25, 1997.

(51) Int. Cl.$^7$ .......................... C04B 14/12; C04B 24/26
(52) U.S. Cl. ...................... 501/141; 501/148; 106/416; 106/724; 106/727; 106/728; 106/803; 106/808; 106/810; 106/823
(58) Field of Search ................................ 106/718, 416, 106/724, 727, 728, 803, 808, 810, 823; 501/141, 148

(56) References Cited

U.S. PATENT DOCUMENTS

| | | | |
|---|---|---|---|
| 1,891,269 A | * 12/1932 | Norton | |
| 3,197,317 A | * 7/1965 | Patchen | |
| 4,471,100 A | 9/1984 | Tsubakimoto et al. | 525/367 |
| 4,935,034 A | * 6/1990 | Alexander | |
| 4,946,904 A | 8/1990 | Akimoto et al. | 525/327 |
| 5,100,984 A | 3/1992 | Burge et al. | 526/240 |
| 5,232,497 A | 8/1993 | Dillenbeck et al. | 106/727 |
| 5,334,241 A | * 8/1994 | Jordan | 501/148 |
| 5,369,198 A | 11/1994 | Albrecht et al. | 526/240 |
| 5,393,343 A | 2/1995 | Darwin et al. | 106/808 |
| 5,556,460 A | 9/1996 | Berke et al. | 106/823 |
| 5,567,236 A | 10/1996 | Schapira et al. | 106/728 |
| 5,576,257 A | * 11/1996 | Jordan | 502/62 |
| 5,736,600 A | * 4/1998 | Kerkare et al. | 524/400 |
| 5,788,762 A | * 8/1998 | Barger et al. | |
| 5,958,131 A | * 9/1999 | Asbridge et al. | 106/718 |
| 6,030,447 A | * 2/2000 | Naji et al. | 106/718 |

FOREIGN PATENT DOCUMENTS

| | | | |
|---|---|---|---|
| CZ | 281565 B6 | * 11/1996 | |
| WO | WO 9858887 | * 12/1998 | |

* cited by examiner

*Primary Examiner*—Paul Marcantoni
(74) *Attorney, Agent, or Firm*—Craig K. Leon; William L. Baker

(57) ABSTRACT

In the preparation of aqueous cement compositions containing a plasticizer, such as an EO/PO polymer-containing plasticizer, or EO/PO comb polymer-containing plasticizer, and further containing clay, such as a smectite clay, which expands when in contact with water, the step of providing an agent operative to modify the clay whereby the plasticizer absorbing capability of the clay is reduced. In exemplary methods of the invention, the plasticizer is an EO/PO (e.g., oxyalkylene) plasticizer and preferably an EO/PO comb polymer, and the clay-activity-modifying agent may comprise an inorganic cation, an organic cation, a polar organic molecule capable of being absorbed by the clay, a clay dispersant (such as a polyphosphate), or a mixture thereof. For clay-activity-modifying agents which comprise a cation or a polar organic molecule, the agent is preferably added to the clay before water is introduced to the clay. For clay dispersant agents and some organic cations such as quaternary amines (which have a strong affinity for cationic exchange with the clay), the agent may be added before, during, or after water is introduced to the clay.

30 Claims, No Drawings

ADMIXTURE AND METHOD FOR OPTIMIZING ADDITION OF EO/PO SUPERPLASTICIZER TO CONCRETE CONTAINING SMECTITE CLAY-CONTAINING AGGREGATES

The present application is a continuation-in-part application based on provisional patent application Ser. No. 60/050,697 filed Jun. 25, 1997.

FIELD OF THE INVENTION

The present invention relates to the improvement of the dosage efficiency of admixtures used in hydraulic cement compositions such as Portland cement concrete, and more particularly to the improvement of the effectiveness of polymer additives having oxyalkylene, or so-called "EO/PO" groups, including comb polymers having a backbone such as a carbon-containing backbone to which are attached oxyalkylene groups.

BACKGROUND OF THE INVENTION

It is known to use so called "EO/PO," or oxyalkylene, polymers in hydraulic cement compositions such as Portland cement concrete. For example, in U.S. Pat. No. 5,393,343, incorporated fully herein by reference, Darwin et al. disclosed an EO/PO type comb polymer useful as a superplasticizer or water-reducer for retaining in concrete a high degree of slump (e.g., high flowability) over a sustained period of time. As used herein, the term "EO/PO" is synonymous with the term "oxyalkylene group" and serves as a convenient short-hand to designate polyoxyalkylene groups (e.g., ethylene oxide/propylene oxide copolymers). Thus, for present purposes, the term "EO/PO type comb polymer" means and refers to a polymer having a backbone such as a carbon backbone to which are attached both carboxylate groups (which function as cement anchoring groups in the cementitious mixture) and pendant groups such as ethylene oxide (EO) groups, propylene oxide (PO) groups, and/or a combination of EO/PO groups. The pendant groups may be ionic or non-ionic. Further examples of EO/PO type comb polymer superplasticizers and water-reducers are shown in U.S. Pat. Nos. 4,946,904, 4,471,100, 5,100,984 and 5,369,198. These patents describe comb polymers which are for example copolymers of polycarboxylic monomers such as maleic acid or anhydride and polymerizable EO/PO-containing monomers such as polyalkylene glycol monoallyl ethers, etc.

While the aforementioned EO/PO comb polymer superplasticizers have been found effective, the dosage efficiency (the amount of the polymer needed to obtain the desired fluidizing or plasticizing effect) tends to vary among different cement or concrete mixes.

SUMMARY OF THE INVENTION

After substantial research, it has been found that the problem varying EO/PO plasticizer dosage efficiencies can be attributed to the presence of certain swellable clays, namely smectites such as sodium montmorillonite, in the aggregate (e.g. sand) used to make concrete or mortar. It has been found that negative interactions occur between EO/PO superplasticizers and mortar or concrete containing smectite clays. It is theorized that such clays expand when initially wetted by the mix water and in the expanded state absorb or entrap the superplasticizer. These negative interactions result in poor workability of fresh mortar or concrete and lead to poor dosage response. Further, several approaches have been found to be effective in restoring the dosage response of these superplasticizers. The effective approaches in general involve reducing or preventing the expansion of the clay prior to the contact of the clay and superplasticizer and include modifications of mixing procedure, the addition of soluble calcium salts (e.g., calcium nitrite, calcium nitrate), and the addition of EO or EO/PO glycols to fresh mortar or concrete. Combinations of these approaches yield the best performance, especially for very harsh, poor quality (clay-bearing) sands.

In a broader sense, then, the invention involves the preparation of aqueous cement compositions containing a plasticizer and further containing clay which expands when in contact with water, and concerns providing an agent operative to modify clay activity. For example, the EO/PO plasticizer absorbing capability of the clay is reduced. Preferably, the clay activity-modifying agent is added to the clay before water is introduced to the clay, although in certain cases the agent may be added in any sequence if it has an affinity for clay which exceeds that of the EO/PO plasticizer.

In further exemplary methods, the clay is a smectite clay and the plasticizer comprises an EO/PO polymer (including comb polymers having EO/PO moieties in the backbone and/or in pendant groups). In further exemplary methods, the clay-activity-modifying agent comprises an inorganic cation, an organic cation, a polar organic molecule capable of being absorbed by clay, a clay dispersant (e.g., a polyphosphate), or a mixture thereof. Preferably, where a cation or polar organic molecule is used, the clay-activity-modifying agent is added to the clay before water is added to wet the clay in the preparation of the aqueous cementitious composition. Where the clay-activity-modifying agent is a clay dispersant, such as a polyphosphate, or where the cation has a stronger affinity for cationic exchange than the plasticizer (such as the organic cations of quaternary amines), then the agent may be introduced before, during, or after water is added to the clay.

The inventors believe that there are at least three possible mechanisms for modifying the clay. One is by reducing the surface activity (or reactivity) of the clay, such as by reducing the ability of the clay particle to absorb the EO/PO plasticizer. A second mechanism or mode of action is to reduce the viscosity of the clay which contributes to the overall slump of the concrete. This can be achieved either by dispersing the clay (whereby the individual clay platelets are pulled apart) or by flocculating the clay (whereby the clay is collapsed or aggregated into a denser unit which produces less viscosity in the concrete mix). A third mode of action is by pre-absorbing the clay by using a sacrificial agent.

The invention also pertains to admixtures comprising an EO/PO plasticizer and a clay-activity-modifying agent, as described above. Preferred admixture compositions of the invention comprise an EO/PO plasticizer, preferably an EO/PO comb polymer (with EO/PO groups in the backbone and/or in pendant groups) and a clay dispersant, such as a polyphosphate, or an organic cation having a strong affinity for clay such as a quaternary amine, an EO/PO containing polymer (which is different than the EO/PO plasticizer being dosed into the cement mix), or a mixture thereof.

Further advantages and features of the invention may be further apparent from the following detailed description.

DETAILED DESCRIPTION OF EXEMPLARY EMBODIMENTS

The term "cement composition" as may be used herein refers to pastes, mortars, grouts such as oil well cementing grouts, and concrete compositions comprising a hydraulic cement binder. The terms "paste", "mortar" and "concrete" are terms of art: pastes are mixtures composed of a hydraulic cement binder (usually, but not exclusively, Portland cement, Masonry cement, or Mortar cement and may also include limestone, hydrated lime, fly ash, blast furnace slag, and silica fume or other materials commonly included in such cements) and water; mortars are pastes additionally including fine aggregate, and concretes are mortars additionally including coarse aggregate. The cement compositions tested in this invention are formed by mixing required amounts of certain materials, e.g., a hydraulic cement, water, and fine or coarse aggregate, as may be applicable to make the particular cement composition being formed.

The term "clay" as used in the present invention specifically concerns 2:1 clays which are typically swelling, absorbing clays often labelled as smectites, montmorillonite, illite, hectorite, or the commercially available BENTONITE. It is also contemplated that volcanic ash and amorphous clays are also included in the absorbtive type materials to be considered within the definition of "clay." The inventors are concerned with the foregoing 2:1 clays (and not 1:1 clays such as kaolin clay which are not typically considered as expanding clays). The problematic 2:1 clays (e.g., smectite) are present in certain sands, and this is what the inventors have surprisingly found as the cause of the EO/PO plasticizer absorption problem which they have solved by the invention described herein.

The present invention is intended particularly for use in increasing the dosage efficiency of EO/PO polymer plasticizers. This includes polymers having oxyalkylene (or EO/PO) constituents, including but not limited to "comb" polymers having EO/PO constituents located in the backbones and/or in pendant groups. EO/PO comb polymers were specifically tested in the present invention, and were most often acrylic polymers or copolymers thereof, which are imidized, as taught in U.S. Pat. No. 5,393,343 assigned to W. R. Grace & Co.-Conn. and incorporated herein by reference. These plasticizers are sold under the trademark "ADVA®."

The ADVA® (specifically polyacrylic acid) comb polymer is made by grafting a polyoxyalkylene amine onto a polycarboxylic acid backbone (amidization/imidization reaction). Another comb polymer (containing EO/PO groups) tested was of the type obtained by polymerization of maleic anhydride and an ethylenically-polymerizable polyalkylene, as prepared in U.S. Pat. No. 4,471,100, the entire disclosure of which is incorporated herein by reference. This product is sold commercially under the tradename "MALIALIM". Both commercial products are sold in the form of metallic salts formed by final reaction of the polymers with a base such sodium or calcium hydroxide.

It is also contemplated that the invention can also increase the dosage efficiency of EO/PO plasticizers which do not have a comb structure (i.e., backbone with pendant groups), but which may have a linear or branched structure, or other structures.

In tests performed, a number of cement compositions, specifically Portland cement concrete samples were prepared containing the usual amount of cement, water, stone and sand. To these mixes were added varying amounts of the "ADVAO®" EO/PO comb polymer described above. The dosage efficiency of the polymer was determined by measuring the flow and slump (ASTM procedure) of each of the mixes.

Test samples prepared using sand from Southwestern United States, CB Rilite sand from Reno, Nev., ("CB") and WMI Placitas sand from Albuquerque, N.Mex. ("WMI"), showed poor dosage efficiency. It was found that the substitution of lab sand (from Kane-Perkins in Milton, N.H.) for either CB Rilite sand or the WMI Placitas sand improved the dosage efficiency. This performance was confirmed in microconcrete and mortar mixtures. That is, the substitution of the Kane-Perkins lab sand for either CB or WMI sand yielded substantially higher flow and slump values.

After analyzing the CB and WMI sands, it was found that both sands contained smectite clay. In parallel experiments, it was found that the addition of sodium montmorillonite (a smectite clay) to Kane-Perkins sand yielded mortar with poor fluidity. Additional testing of other days showed that hectorite, another type of smectite clay, also yielded poor performance in mortar, and that kaolinite, a non-smectite (e.g., 2:1) clay, did not have an adverse effect on performance. The poor performance observed for mortar or concrete containing ADVA® superplasticizer and clay-bearing sands was also demonstrated for other EO/PO superplasticizers. It was found that another commercially available EO/PO superplasticizers (e.g., MALIALIM AKM 1511), caused a similar drastic reduction in fluidity in mortar containing smectite clay. Based on this data and previous testing, it appears that the negative interactions with smectite clays can be attributed to a range of EO/PO plasticizers and not only ADVA® superplasticizers.

After discovering the interactions between smectite clays and EO/PO superplasticizers in mortar and concrete, significant efforts were focused on attempting to remedy the problem. Primarily, three different approaches were found to be effective in restoring the effectiveness of EO/PO polymers in mortar or concrete containing smectite clays.

First, the addition of agents operative to reduce EO/PO absorbing capabilities of clay contained in clay-bearing aggregate, which agents were added to mortar mixtures before the addition of superplasticizer, effectively improved the performance of mortars containing smectite clays and ADVA® superplasticizer. Where the agent comprised a glycol, such as polyethylene glycol ("PEG"), it was seen that the higher molecular weight PEG's yielded a significant improvement in mortar flow. The use of glycol containing both ethylene oxide and propylene glycol was also found to be effective in improving mortar flow. Thus, it was demonstrated that both EO and EO/PO materials can be used to partially restore mortar performance. In either case, it is likely that these compounds are being absorbed on the clay surface, thus satisfying some of the clay's affinity for polymer absorption, and in essence acting like a "sacrificial lamb".

A second approach found to be extremely effective was the restoration of EO/PO plasticizer dosage efficiency through the alteration of mortar or concrete mixing procedures. In particular, it was found that the order of addition of materials into a mixer could have a profound effect on performance of mortar or concrete containing an EO/PO superplasticizer (e.g, ADVA® superplasticizer) and clay-bearing sand. It was found that by delaying the addition of clay-bearing sand (until after all other materials have been added), the dosage efficiency of ADVA® superplasticizer could be restored. Furthermore, it was found that only a small portion of cement is needed initially to trigger this effect. The essential element of this discovery is that cement (in some amount) should be present in the mixture prior to or at the same time as the clay-bearing sand comes in contact with mixing water. If this order of addition can be assured, the dosage efficiency of EO/PO superplasticizers in mortar or concrete can be significantly improved, regardless of the presence of smectite clays.

It was also discovered that by changing the order of addition during mixing that the overall water demand of mortar (regardless of superplasticizer) can be reduced. Therefore, when treating mortar containing conventional naphthalene/formaldehyde condensate plasticizer identically to mortar containing ADVA® superplasticizer, the perform of each mixture can be improved. If this modified mixing method is used for both of the above mortars (each containing 0.6% clay), the new dosage efficiency can be improved. When lower clay dosages are used, the dosage efficiency can be increased. It was also observed that mortar (with clay-bearing sand) containing no superplasticizer can be improved using the modified mixing method, that is the fluidity of a reference mortar can also be improved with this mixing technique.

Finally, a promising approach was found to be the addition of soluble calcium salts (preferably calcium nitrate) prior to the introduction of clay-bearing sand. It was shown that the dosage response of EO/PO superplasticizer can be restored with this approach. It was further found that the addition of calcium nitrate directly to clay-bearing sand was more effective than adding calcium nitrate to mix water. It is further believed that soluble potassium salts may also be suitable for the invention.

When studying the behavior of an extremely poor quality sand containing smectite (from Reno), it was found that changing the order of addition of materials was not in itself sufficient to remedy the poor performance of mortar containing ADVA® superplasticizer. Additional work showed that for cases such as this poor quality sand, it is sometimes necessary to combine the previously described three approaches (that is, modified mixing method+polyethylene glycol+calcium nitrate). This combined approach yielded optimal performance and showed a combined synergistic effect. It was further shown that an optimal blend of various molecular weight polyethylene glycols could be determined which yielded the most beneficial flow properties.

Additionally, further exemplary methods of the invention may involve agents which do not preferentially need to be introduced prior to the addition of a plasticizer or the addition of water to the clay. For example, the use of a polyphosphate, such as sodium hexametaphosphate, sodium tripolyphosphate, sodium pyrophosphate, and sodium acid pyrophosphate, or a mixture thereof, does not require a superplasticizer be added after the agent which is intended to reduce the EO and/or PO absorbing capabilities of the clay.

Exemplary clay-activity-modifying agents that are suitable for use in the invention may be categorized as follows.

Exemplary inorganic multivalent cations which are useful for modifying clay activity include multivalent cations, such as calcium, magnesium, aluminum, iron, or a mixture thereof. Calcium nitrite and calcium nitrate are preferred inorganic cations, as mentioned above, which further may be used with oxyalkylenes such as (poly)ethylene glycol (PEG).

Exemplary clay-activity-modifying agents also include inorganic monovalent cations such as $K^+$, $NH_4^+$, $Cs^+$, $Rb^+$, $Fr^+$, or a mixture thereof). Among these, potassium nitrate is a preferred.

Further exemplary clay-activity-modifying agents include organic cations, such as a quaternary amine, (poly) quaternary amine, an amine oxide, or a mixture thereof. The term "organic cation" as used herein refers to any exchange agent (any compound capable of exchanging interlammelar cations associated with 2:1 clays (e.g., smectite) comprising either (a) an organic group bonded to a cationic salt group selected from phosphonium, pyridinium, sulfonium and quaternary ammonium (including poly-quaternary ammonium), or (b) an organic compound containing a single cationic amine salt group and no other amine groups. The organic group bonded to the cationic group of the exchange agents in either category may be a polymeric group. Included among the organic cations which may be used in the present invention are amphoteric materials (e.g., amphoteric surfactants). Organic cations which are believed to be useful in the invention include, but are not limited to, hexadecyltrimethylammonium, methyltriphenylphosphonium, benzyltriphenylphosphonium, and surfacants such as N,N-dimethyl-1-hexadecaneamine oxide (commercially available from Akzo Novel Chemical, Chicago, Ill., under the tradename Aromox® DM-16), and N,N,N',N',N'-pentamethyl-n-tallow-1,3,propanediammonium chloride (commercially available also from Akzo under the tradename Duoquad® T-50). Other exemplary organic cations believed to be useful in the invention include ($C_{12}$–$C_{18}$) fatty amines and amino acids (e.g., lysine). The clay-activity-modifying organic cations are preferably provided in aqueous solution, for safety and low cost. However, in some cases, such as when it is desired to use an organic cation agent in the form of a commercially available organic surfactant, the organic cation agent may be provided in an organic solvent.

A preferred organic cation is a quaternary amine, such as a (poly)quaternary amine in combination with polyethylene glycol (PEG), a combination which facilitated improved EO/PO plasticizer performance that was better than using either the quaternary amine or PEG alone. The use of a quaternary amine having a bonded polyoxyethylene functional group was also found to be more effective than other quaternary amines without bonded polyoxyethylene, particularly when added early in the mixing cycle.

Other exemplary clay-activity-modifying agents include polar organic molecules capable of being absorbed by (smectite type) clays, such as an oxyalkyene (e.g., ethylene and/or propylene glycols such as PEG), a crown ether, a polyvinyl alcohol, a polyacrylic acid, a polymethacrylic acid, a polyacrylate, a polymethacrylate, a gluconate, a heptagluconate, a heptaglyconic acid, a gluconic acid, a corn syrup, or a mixture thereof. If the polar organic molecule is a polyacrylic acid, a polymethacrylic acid, a polyacrylate, or a polymethacrylate, then the molecular weight should be 2,000 or less. These are preferably added before the EO/PO type plasticizer is introduced to the clay. This may be accomplished by having the clay-activity-modifying agent present before water is added to the clay whereupon the EO/PO type plasticizer is then carried into chemical contact with the clay. It is found that certain clay-activity-modifying agents which have an affinity for clay that is stronger than the EO/PO type plasticizer's affinity for the clay, such as quaternary amines, (e.g., poly-quaternary amines), and polyphosphates, may be added simultaneously with the EO/PO plasticizer or before the EO/PO plasticizer is added.

A further exemplary clay-activity-modifying agent comprises a polyphosphate, such as a metaphosphate (e.g., sodium metaphosphate), a tripolyphosphate (e.g., sodium tripolyphosphate), a pyrophosphate (e.g., sodium pyrophosphate, sodium acid pyrophosphate), or a mixture thereof. Still further exemplary methods and admixtures of the invention comprise using a cement dispersant, such as a lignosulfonate, a hydroxylated carboxylate, a carbohydrate, or mixture thereof, in addition to the clay dispersant.

Those skilled in the cement and concrete arts will understand that the amount of clay-activity-modifying agent (whether it be of the cationic, polar organic clay-absorbable molecule, or clay dispersant variety) to be incorporated into the mix will be varied according to the nature of the sand, the amount and nature of the plasticizer to be dosed, the particular addition sequence of components to be used, mixing conditions, and other factors. It is believed that a wide range, such as 0.005% s/s (by percent weight based on solids cement) up to 12% s/s is usable, with a range of about 0.01–10.0% s/s preferred. Again, however, the range is dependent upon the nature of conditions and nature of the mixing operation.

A better understanding of the present invention may be more readily understood when the following examples are considered.

EXAMPLE 1

A conventional plasticizer that does not have EO/PO groups, namely, a sodium naphthalene sulfonate formaldehyde condensate (NSFC) superplasticizer sold by W. R. Grace & Co.-Conn. under the tradename DARACEM® 19, was compared with an EO/PO plasticizer sold by Grace under the tradename ADVA®. The cement mix was formulated containing 1100 g of Type 1 Portland cement with 2035 g of sand, and water was added. For mixes #1, #3, and #5, the amount of water was adjusted individually until the MC (microconcrete) slump of each mix exceeded 120 mm.; for mixes #2, #4, and #6, the same amount of water corresponding to #1, #3, and #5 was used for the purposes of determining slump.

Slump was measured by placing the aqueous cement/sand/plasticizer mix samples into a cone and inverting the cone onto a table to cast a cone-shaped sample, and measuring the drop in height of the cone. The cone size size used was in accordance with JIS #A-1173 (cone height=150 mm; upper diameter=50 mm; bottom diameter=100 mm).

First, a control test was done to confirm that in normal laboratory sand (Cane-Perkins, Milton, N.H.) the EO/PO superplasticizer was three times or more as efficient in providing slump.

The control samples were relatively unaffected by lab sand, but the slump of EO/PO plasticizer-containing samples having smectite clays (Placitas sand (from Alberquerque, N.Mex.; and Rilite sand from CB Concrete, Reno Nev.) were adversely affected. Thus, surprisingly the smectite-type clay-bearing aggregates were found to decrease the dosage efficiency of EO/PO-type plasticizers. The tests are summarized in Table 1 below.

TABLE 1

| Mix | Plasticizer | Dosage % s/s | MC slump mm | Sand |
|---|---|---|---|---|
| #1 | non-EO/PO | 0.37 | 122 | lab sand |
| #2 | EO/PO | 0.083 | 122 | lab sand |
| #3 | non-EO/PO | 0.37 | 121 | Placitas |
| #4 | EO/PO | 0.083 | 90 | Placitas |
| #5 | non-EO/PO | 0.37 | 129 | Rilite |
| #6 | EO/PO | 0.083 | 95 | Rilite |

As shown in the table above, the efficiency of the EO/PO plasticizer (measured in terms of providing slump) was not affected by ordinary laboratory sand, since about one-third of the EO/PO plasticizer had the same slump efficiency of the non-EO/PO plasticizer in the laboratory sand (typically, Grace's ADVA® "superplasticizer" is approximately three times or more as efficient as the non-EO/PO containing plasticizer). However, when the smectite clay-bearing sands were used, the slump performance of the EO/PO superplasticizer decreased dramatically.

EXAMPLE 2

Samples were tested using standard lab sand but with hectorite clay (a smectite) to confirm that the decreased slump performance of the EO/PO superplasticizer was due to the clay in the aggregate. Water addition was similar to the previous example. Hectorite was added at 2% based on sand weight to the cement, and then the different plasticizers were added after a few seconds. NSFC type plasticizer (DARACEM® 19) was compared to a performance-equivalent amount of EO/PO plasticizer (ADVA®). The results are provided in Table 2 below. It is seen that the EO/PO plasticizer (mix #8) suffered a decreased slump performance that is attributable to the presence of hectorite clay.

TABLE 2

| Mix | Plasticizer/Mix | Dosage % s/s | MC slump mm | Sand |
|---|---|---|---|---|
| #7 | non-EO/PO Hectorite | 0.37 | 130 | lab sand |
| #8 | EO/PO Hectorite | 0.093 | 78 | lab sand |

EXAMPLE 3

A further test was done to determine the effect of adding an inorganic cation salt to a mixture containing a sodium montmorillonite sand. To prepare the mix, 0.6% (based on weight sand) sodium montmorillonite (a smectite clay) was added to standard laboratory sand. In a further sample, 0.5% by weight (based on weight of cement) of calcium nitrite (Grace DCI®) was used, and microconcrete slump tests were done. The calcium nitrite was added to the clay before the EO/PO plasticizer was added to the clay. The use of the salt was seen to improve the dosage efficiency of the EO/PO plasticizer. The results are shown in Table 3 below.

TABLE 3

| Mix | ADMIXTURE | Dosage % s/s | MC Slump mm. |
|---|---|---|---|
| #9 | EO/PO only | 0.10 | 56 |
| #10 | EO/PO<br>Calcium Nitrite | 0.10<br>0.50 | 120 |

EXAMPLE 4

Another set of samples were tested to illustrate the effects of organic cations on EO/PO dosage efficiency. To prepare the mix, sodium montmorillonite (a smectite clay) was again added to standard laboratory sand mixtures, and this was prepared similar to the previous examples. An organic cation, namely, cetyltrimethylammonium bromide (CTB) (0.04% s/s) was added to the mix at the same time that the EO/PO (ADVA®) as added (see mix #11). A further organic cation, tetrabutylammonium bromide (TTB) (0.04% s/s) was also tested. A further example, lauryl dimethylamine oxide (LDAO) (0.04% s/s) was also tested. This was also added at the same time as the EO/PO plasticizer. In both cases, the dosage efficiency of the EO/PO plasticizer was increased by the presence of the organic cation, when compared to mix #9 above. The results are shown in the slump performance in Table 4 below, wherein the slump figures were restored to above 110 mm

TABLE 4

| Mix | ADMIXTURE | Dosage % s/s | MC Slump mm. |
|---|---|---|---|
| #11 | EO/PO | 0.10 | 116 |
|  | CTB (organic cation) | 0.04 |  |
| #12 | EO/PO | 0.10 | 110 |
|  | TTB (organic cation) | 0.04 |  |
| #13 | EO/PO | 0.10 | 121 |
|  | LDAO (amine oxide) | 0.04 |  |

EXAMPLE 5

Another set of samples were tested to illustrate the effects of a polar organic molecule on EO/PO dosage efficiency. To prepare the mix, sodium montmorillonite (a smectite clay) was again added to standard laboratory sand mixtures, and this was prepared similar to the previous example. An organic polar molecule, namely, polyethylene glycol (PEG) (molecular weight about 1000) (0.04% s/s) was added to the mix before the EO/PO (ADVA®) as added. A further polar molecule, namely, polyvinyl alcohol (grade BP-03made by ChemComm, Inc. of Katy, Tex.) and a crown ether (from Aldridge Chemicals) were also tested. In each of these cases, the dosage efficiency of the EO/PO plasticizer was restored, when compared to the EO/PO alone (see mix #9 above). The results are shown in the slump performance in Table 5 below.

TABLE 5

| Mix | ADMIXTURE | Dosage % s/s | MC Slump mm. |
|---|---|---|---|
| #14 | EO/PO | 0.10 | 123 |
|  | PEG | 0.04 |  |
| #15 | EO/PO | 0.10 | 125 |
|  | PVA | 0.04 |  |
| #16 | EO/PO | 0.10 | 122 |
|  | Crown ether | 0.04 |  |

EXAMPLE 6

Another set of samples were tested to illustrate the effects of a polyphosphate on EO/PO dosage efficiency. To prepare the mix, sodium montmorillonite (a smectite clay) was again added to standard laboratory sand mixtures, and this was prepared similar to the previous examples. A polyphosphate, sodium hexametaphosphate (SHMP) (0.10% s/s) and a calcium lignosulfonate (CLS) (0.15% s/s) was added to the mix at the same time the EO/PO (ADVA®) as added. Other polyphosphates were tested, such as sodium tripolyphosphate (STP) and sodium acid pyrophosphate (SAPP). All phosphates were obtained from Solutia, Inc. of St. Louis, Mo. The dosage efficiency of the EO/PO was thus improved (in comparison to the EO/PO alone)(see mix #9 above). The results are shown in Table 6 below.

TABLE 6

| Mix | ADMIXTURE | Dosage % s/s | MC Slump mm. |
|---|---|---|---|
| #17 | EO/PO | 0.10 | 117 |
|  | SHMP | 0.04 |  |
|  | CLS | 0.15 |  |
| #18 | EO/PO | 0.10 | 108 |
|  | STP | 0.04 |  |
|  | CLS | 0.15 |  |
| #19 | EO/PO | 0.10 | 116 |
|  | SAPP | 0.04 |  |
|  | CLS | 0.15 |  |

The foregoing examples provided for illustrative purposes only and are not intended to limit the scope of the invention.

It is claimed:

1. In the preparation of aqueous cement compositions containing a superplasticizer, said superplasticizer comprising a comb polymer having pendant groups comprising ethylene oxide and propylene oxide groups, and further containing a smectite clay which expands when in contact with water and which has the ability to absorb said superplasticizer when it expands upon contact with water, the step of providing an agent operative to diminish the ability of said smectite clay to absorb said comb polymer superplasticizer when said smectite clay expands upon contact with water, said agent comprising an inorganic cation, an organic cation, a polar organic molecule, a clay dispersant operative to reduce absorptivity of said smectite clay, or mixture thereof.

2. The method of claim 1 wherein said agent comprises an inorganic cation.

3. The method of claim 2 wherein said inorganic cation is multi-valent.

4. The method of claim 3 wherein said inorganic multi-valent cation comprises calcium, magnesium, aluminum, iron, or a mixture thereof.

5. The method of claim 3 wherein said inorganic multi-valent cation agent comprises calcium nitrite, calcium nitrate, or a mixture thereof.

6. The method of claim 5 further comprising an oxyalkylene molecule having a molecule structure different from said superplasticizer comprising a comb polymer having ethylene oxide and propylene oxide and propylene oxide pendant groups.

7. The method of claim 3 wherein said inorganic multi-valent cation is present when water is added to the smectite clay.

8. The method of claim 1 wherein said inorganic cation agent comprises a monovalent cation.

9. The method of claim 8 wherein said inorganic monovalent cation comprises $K^+$, $NH_4^+$, $Rb^+$, $Fr^+$, or a mixture thereof.

10. The method of claim 9 wherein said inorganic monovalent cation is present when water is added to the smectite clay.

11. The method of claim 1 wherein said agent comprises an organic cation.

12. The method of claim 11 wherein said organic cation agent comprises (a) an organic group bonded to a cationic salt group selected from phosphonium, pyridinium, sulfonium, quaternary ammonium, or (poly)quaternary ammonium, amine oxide, or (b) an organic compound containing a single cationic amine salt group.

13. The method of claim 12 wherein said organic cation agent comprises a (poly) quaternary amine.

14. The method of claim 1 wherein said amine further comprises an oxyalkylene group.

15. The method of claim 12 wherein said organic cation is present when water is added to the smectite clay.

16. The method of claim 1 wherein said polar organic molecule is capable of being absorbed by the smectic clay.

17. The method of claim 16 wherein said polar organic molecule comprises an oxyalkylene, a crown ether, a polyvinyl alcohol, a polyacrylic acid, a polymethacrylic acid, a polyacrylate, a polymethacrylate, a gluconate, a heptagluconate, a heptaglyconic acid, a gluconic acid, a corn syrup, or a mixture thereof.

18. The method of claim 17 wherein said polar organic molecule agent comprises an oxyalkylene.

19. The method of claim 18 wherein said oxyalkylene comprises an ethylene glycol, a propylene glycol, or a mixture thereof.

20. The method of claim 16 wherein said polar organic molecule comprises an oxyalkylene polymer which has a different molecular structure than said superplasticizer comprising a comb polymer having ethylene oxide and propylene oxide pendant groups.

21. The method of claim 16 wherein said polar organic molecule comprises comb polymer having pendant ethylene oxide and propylene oxide groups with an average molecular weight less than 1000.

22. The method of claim 16 wherein said polar organic molecule agent is present when water is added to the clay.

23. The method of claim 1 wherein said agent is a clay dispersant operative to reduce the ability of the clay to absorb said superplasticizer.

24. The method of claim 1 wherein said clay dispersant agent comprises a polyphosphate.

25. The method of claim 24 wherein said polyphosphate clay dispersant agent comprises a hexametaphosphate, a tripolyphosphate, a pyrophosphate, or a mixture thereof.

26. The method of claim 25 wherein said agent comprises a hexametaphosphate which is sodium hexametaphosphate.

27. The method of claim 25 wherein said agent comprises a tripolyphosphate which is sodium tripolyphosphate.

28. The method of claim 25 wherein said agent comprises a pyrophosphate which is a sodium prophosphate, a sodium acid pyrophosphate, or a mixture thereof.

29. The method of claim 25 further comprising adding a cement dispersant comprising a lignosulfonate, a hydroxylated carboxylate, a carbohydrate, or a mixture thereof.

30. The method of claim 1 wherein said agent is present when water is added to the clay.

* * * * *